UNITED STATES PATENT OFFICE.

RICHARD G. LATTING, JR., OF BROWNWOOD, TEXAS.

PROCESS OF PURIFYING VEGETABLE OILS.

SPECIFICATION forming part of Letters Patent No. 547,122, dated October 1, 1895.

Application filed March 14, 1895. Serial No. 541,818. (No specimens.)

*To all whom it may concern:*

Be it known that I, RICHARD G. LATTING, Jr., a resident of Brownwood, in the county of Brown and State of Texas, have invented certain new and useful Improvements in the Art of Purifying Vegetable Oils; and I do hereby declare the following to be a full, clear, and exact description of the invention, such as will enable others skilled in the art to which it pertains to make and use the same.

Heretofore the method of purifying and refining crude cotton-seed oil has been to subject said oil to the action of an aqueous solution of caustic soda to neutralize its acids and discharge its coloring-matter. At the time of the application of said solution to the oil the whole mass is agitated for the purpose of thoroughly mixing said ingredients and promoting a thorough chemical action. Heat is also simultaneously applied, the object of which, in conjunction with said agitation, is to prepare for the precipitation of what is known to the trade as "soap-stock," and which is composed of a portion of the caustic solution, saponified oil, coloring-matter, and other substances, such as cotton-seed meal, &c. After the soap-stock is separated in the mass and the heat and agitation are stopped it settles to the bottom and the oil rises to the top of the tank in which they are contained. The oil is then drawn or pumped off from the soap-stock. For the above purposes from three to seven per cent. of a caustic-soda solution having a strength of from 10° to 20° Baumé is employed, the amount and strength varying somewhat with the condition of the oil. The amount of agitation and heating is also varied to secure the desired result, which involves a degree of saponification that results in the production of from about eight to twenty-five per cent. of soap-stock. There are several methods of "finishing" the oil after its separation from soap-stock, as above stated. According to the most approved of these, oil is pumped or drawn off from the soap-stock into another vessel and water, warm or cold, in varying quantities, is pumped or poured into it. The whole mass is then agitated, heat being applied in some cases, which treatment produces a mechanical mixture of the oil and water and causes the water to absorb all of the particles of soap or soap-stock in the oil caused by the original application of the caustic soda solution. The agitation and heat, if any has been used, is then discontinued, and the water settles to the bottom, carrying with it all soapy particles and foreign substances and the oil rises to the top. The water is then withdrawn from the bottom, carrying with it the soapy particles and foreign substances, leaving the oil in the vessel. Heat and agitation are then applied to the oil to evaporate the remaining water. The oil is then ready for sale as refined cotton-seed oil.

The loss sustained by the refiner in using the above or any of the processes known prior to the present improvement is from eight to twenty per cent. of the oil. A large part of the loss is caused by the saponification which occurs when the caustic soda solution is applied to the crude oil. The saponified or semi-saponified oil thus produced becomes a component part of the soap-stock, together with the coloring-matter and other foreign substances, and is worth only one-fifth or one-sixth as much as the oil. The amount of oil that is saponified and that enters into the soap-stock is governed by the amount of caustic-soda solution necessary to neutralize the acid and to extract the coloring-matter of the crude oil.

The object of my invention is to refine crude cotton-seed oil and to make several well-known grades of refined oil with the production of little or no soap-stock and without any appreciable loss of oil; and my invention consists in the improvements in the art hereinafter described and particularly pointed out. I first agitate crude cotton-seed oil with water or steam, the mixture being heated to from 60° to 200° Fahrenheit, about 160° being preferred; or a solution of a caustic alkali, preferably soda, or of an alkaline carbonate may be employed instead of pure water. In the latter case care is taken that the alkali shall not materially exceed an amount which will be readily neutralized by the free acid of the crude oil and that it shall not be sufficient to produce saponification of the oil. A solution equal to from about one-half to one per cent. of the volume of the oil and having a strength of 20° Baumé, or one to two per cent. at 10° Baumé, or two to four per cent. at 5°

Baumé, or four to eight per cent. at 2½° Baumé, or eight to sixteen per cent. at 1¼° Baumé will answer the purpose of this invention. Whatever the strength and amount of the solution employed saponification of the oil should be avoided, and for this reason the heating and agitation will be arrested upon the first appearance of cloudiness or other indication of the beginning of saponification. After agitation and heating of the oil and water or the oil and an alkaline solution, as the case may be, the cotton-seed meal and other foreign substances, including the water and alkali, if such is used, are separated from the oil by settling and removal from the containing tank or vessel either of the oil or the sediment. The principal object of this first step is to remove cotton-seed meal and other coarse dirt or refuse. Simultaneously with the operation of separating the coarser impurities, such as meal, a part of the free acid of the oil may be removed by the use of a weak alkaline solution, as above stated, or removal of the free acid by a weak alkaline solution may be entirely subsequent to the removal of the meal. The oil thus partially purified is again mixed with ten to twenty per cent. of its volume of water and heated to from 60° to 200° Fahrenheit, 160° being preferred, and it is also agitated to produce thorough mixture and form an emulsion. A solution of caustic alkali, such as soda or an alkaline carbonate, is then added in quantity and strength sufficient to neutralize the free acid or acid remnant and discharge the coloring-matter of the oil without producing any material degree of saponification of the oil. To secure these objects, a solution of caustic soda having a strength of about 20° Baumé and a volume of from about one-fourth of one per cent. to four per cent. of the oil will be suitable, approximately the minimum per cent. named being deemed preferable. Though I prefer to introduce the pure water first and the solution subsequently, they may be mixed to weaken the solution, which is then mixed with the oil during agitation and heating, as in the first instance, and in general the amount and strength of the alkali solution should be such as not to saponify the oil or any material part of it, and an operator by observing the above-named limits or proportions can, with ordinary care, avoid the evil spoken of, and the production of soap-stock will be avoided, and whatever the strength and volume of the alkaline solution employed in any stage of my process saponification of the oil will be avoided by timely suspension of the heating and agitating before or as soon as an indication of approaching saponification occurs. The water, alkali, coloring-matter, and acid, whether free or in combination, are separated from the oil by settling and can be withdrawn from below it, the withdrawal being continued until oil or oil emulsion begins to follow, or, if preferred, the oil may be removed. If at any stage the oil and water or the oil and alkaline compound or solution do not thoroughly separate, ten to twenty per cent. of water, preferably hot, may be added and preferably without agitation.

The second part of my process just above described is repeated one or more times to remove all of the acid and coloring-matter of the oil or a sufficient part thereof for the production of what is known in the trade as "refined cotton-seed oil." The oil is then washed with water and heat and agitation applied, and it is otherwise treated according to the well-known method above described in connection with oil separated from soap-stock. If, however, in carrying out my process an emulsion is produced, it is separated from a main body of oil and allowed to stand in a vessel by itself until as much water settles therefrom as practicable, which water having been separated from the emulsion the latter is mixed with another "tank" of oil at an earlier stage in the process of refining.

After the last separation by settling and after the removal of an emulsion, as just above described, the remaining portions of water are evaporated from the oil by heat with agitation and the product is refined oil and can be graded as "butter or cooking oil," "prime summer yellow oil," or "off-summer yellow oil," according to its quality and appearance resulting from the condition of the materials employed and the care exercised in refining.

The above-described improvement is not limited to the use of soda. Other alkalies, and in some cases the carbonates of alkalies—such as carbonate of ammonia or potash, or soda, or a bicarbonate—may be used with or substituted for caustic soda.

Some of the beneficial effects of my improvements might be secured by reducing the alkali or alkaline substance employed to a fine or powdered condition and introducing it separately, water being added to the oil either before or after such introduction of the alkali; but such methods are not thought preferable.

My improved method, though described as applied to crude oil, may be advantageously applied to partially-refined oil.

I am aware that it has been proposed to wash various animal, vegetable, and mineral oils with cold water, and then heat the washed product by means of sulphuric acid, and subsequently introduce a relatively large per cent. of a solution of a caustic alkali having a strength of 40° Baumé, and such methods I disclaim. I heat the oil and water during the washing process, and subsequently use no acid, but form a hot emulsion and treat it with an alkaline solution having a strength not to exceed about 20° Baumé, it being one of the prime objects of my improvement to avoid loss by saponification of oil, as above explained.

I am also aware that oil at boiling temperature has been washed with hot water and treated with one per cent. of caustic soda, and subsequently subjected to a temperature of 250°, and such method I disclaim, both the amount of soda and the temperature being excessive for my purposes. It is characteristic of my improvement that an alkaline solution in the volume and strength herein specified is used subsequently to the washing and the separation of meal, and I do not contemplate the use of a temperature higher than the boiling-point of water.

Having thus fully described my invention, what I claim is—

1. The improvement in refining crude oil which consists in mixing with it water, with heat and agitation; subsequently removing cotton seed meal, water and other foreign substances from the oil; mixing the oil thus freed from coarser impurities with ten to twenty per cent. of its volume of water the mixture being heated and agitated; subjecting the oil to the action of an alkaline solution having a volume of from about one fourth of one to four per cent. of the oil and a strength of about 20° Baumé with heat and agitation to neutralize the free acid of the crude oil; suspending the heating and agitation at or before the appearance of indications of saponification of the oil; removing the said neutralized acid, coloring matter and other impurities from the oil; and repeating the treatment with alkali to remove the residue of such impurities, substantially as set forth.

2. The improvement in purifying cotton seed oil which consists in mixing with it from ten to twenty per cent. of its volume of water with heat and agitation; subjecting this mixture with heat and agitation to the action of a solution of an alkali having a volume of about one fourth of one to four per cent. and a strength of about 20° Baumé; suspending the heating and agitation at or before the indication of saponification of the oil; separating the oil from the neutralized acid, coloring matter and other impurities; and separately removing any emulsion formed to use in a repetition of the process with other oil; repeating the treatment with water and alkali and the separation of sediment, substantially as set forth.

In testimony whereof I have signed this specification in the presence of two subscribing witnesses.

RICHARD G. LATTING, JR.

Witnesses:
ARCH. M. CATLIN,
EMMA G. BRASHEARS.